(12) United States Patent
Kerr et al.

(10) Patent No.: US 11,537,545 B2
(45) Date of Patent: Dec. 27, 2022

(54) DEADLOCK CONDITION AVOIDANCE IN A DATA PROCESSING SYSTEM WITH A SHARED SLAVE

(71) Applicant: NXP USA, Inc., Austin, TX (US)

(72) Inventors: Gary Robert Kerr, Glasgow (GB); Sunny Gupta, Glasgow (GB); Andrew Robertson, Glasgow (GB)

(73) Assignee: NXP USA, Inc., Austin, TX (US)

( * ) Notice: Subject to any disclaimer, the term of this patent is extended or adjusted under 35 U.S.C. 154(b) by 2 days.

(21) Appl. No.: 16/944,290

(22) Filed: Jul. 31, 2020

(65) Prior Publication Data

US 2022/0035761 A1 Feb. 3, 2022

(51) Int. Cl.
*G06F 13/40* (2006.01)

(52) U.S. Cl.
CPC .............................. *G06F 13/4036* (2013.01)

(58) Field of Classification Search
CPC .................................................. G06F 13/4031
See application file for complete search history.

(56) References Cited

U.S. PATENT DOCUMENTS

| 4,736,366 | A | * | 4/1988 | Rickard | G06F 13/374 |
|---|---|---|---|---|---|
| | | | | | 370/439 |
| 5,544,332 | A | | 8/1996 | Chen | |
| 5,845,097 | A | * | 12/1998 | Kang | H04L 12/40202 |
| | | | | | 710/117 |
| 5,889,972 | A | | 3/1999 | Allingham | |
| 6,496,890 | B1 | * | 12/2002 | Azevedo | G06F 13/28 |
| | | | | | 710/107 |
| 2005/0102456 | A1 | * | 5/2005 | Kang | G06F 13/4031 |
| | | | | | 710/113 |
| 2005/0223147 | A1 | * | 10/2005 | Hellwig | G06F 13/362 |
| | | | | | 710/110 |
| 2008/0244029 | A1 | * | 10/2008 | Soga | H04L 12/403 |
| | | | | | 709/209 |
| 2010/0153602 | A1 | * | 6/2010 | Kume | G06F 13/4226 |
| | | | | | 710/110 |
| 2011/0231589 | A1 | * | 9/2011 | Wu | G06F 13/4291 |
| | | | | | 710/110 |
| 2012/0089759 | A1 | * | 4/2012 | Shirlen | G06F 13/362 |
| | | | | | 710/113 |
| 2015/0242266 | A1 | * | 8/2015 | Kori | G06F 11/0787 |
| | | | | | 714/57 |
| 2018/0074875 | A1 | * | 3/2018 | Becht | G06F 11/0757 |

OTHER PUBLICATIONS

ARM: "Cortex-M™ System Design Kit" Revision: r0p0, Technical Reference Manual, 2011, pp. 1-171.

(Continued)

*Primary Examiner* — Phong H Dang

(57) ABSTRACT

A system and method for controlling deadlock in a processing system includes asserting a deadlock condition indicator when a timer in a timer circuit has passed a predetermined period of time while a first bus master device occupies a port of a bus slave device, and an empty indicator indicates a second bus master is waiting to occupy the port of the bus slave device while the first bus master is occupying the port of the bus slave device. When the deadlock condition indicator is asserted, action can be taken by the processing system to eliminate the deadlock.

19 Claims, 3 Drawing Sheets

(56) References Cited

OTHER PUBLICATIONS

Harshavardhan et al.: "Bus Deadlock Avoidance Using Reconfigurable Arbiter", International Journal of Applied Engineering Research ISSN 0973-4562 vol. 11, No. 3 (2016) pp. 1989-1997, pp. 1989-1997.
Purantra et al.: "A Novel Approach to Solve Deadlock Problem in On-Chip BUS Communication", International Journal of Emerging Engineering Research and Technology vol. 3, Issue 8, Aug. 2015, pp. 96-109.
Qualcomm Interconnect Technology Center: "Flexnoc 3.5.3 QoS", Designer's Manual, Oct. 16, 2017, pp. 1-58.

* cited by examiner

DEADLOCK CONDITION AVOIDANCE IN A DATA PROCESSING SYSTEM WITH A SHARED SLAVE

BACKGROUND

Field

This disclosure relates generally to data processing systems, and more specifically, to deadlock condition avoidance in a data processing systems with a shared slave.

Related Art

In a multiple master data processing system, such as in a system on a chip (SoC) or network on a chip (NoC) architecture, avoiding deadlock conditions is important so as not to starve any master device from access to a shared slave device. Some current techniques attempt to address deadlock conditions by detecting unresponsive shared slave devices. Other current techniques to avoid deadlocks include using time sharing arbitration schemes, such as a round robin scheme, in which each master gets an equal amount of time. However this is not appropriate for data processing systems which require certain master devices to be provided a higher priority for accessing a particular shared slave device.

With the current techniques, though, it is possible that, despite normally functioning and responsive system components (e.g. masters, responsive slaves, arbitration logic, etc.), deadlock conditions can still occur. Therefore, a need exists for an improved scheme to avoid or address deadlock conditions in order to prevent access starvation of lower priority masters.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In a multiple master system which allows different masters to have different priority levels for accessing one or more slave devices, it is possible for a higher priority master to continuously access a particular slave device thus resulting in a deadlock condition which starves access to that particular slave device by a lower priority master. This may be the case even when the slave device is responsive and functioning properly. In one aspect, to detect, and thus possibly avoid, such a deadlock condition, master accesses to the same slave are monitored. By monitoring changes in the master accessing a given slave over a period of time, potential deadlock conditions can be detected. This can be done through the use of a counter which is reset with a count-down value each time a master accessing a given slave changes to a different master. If the counter expires before the master accessing the given slave changes to a different master, and there is at least one other master waiting to access the given slave, a deadlock condition indicator is asserted. This indicator can be provided back to arbitration circuitry to address the potential deadlock condition, or this indicator can be provided as a system interrupt.

Figure 1:
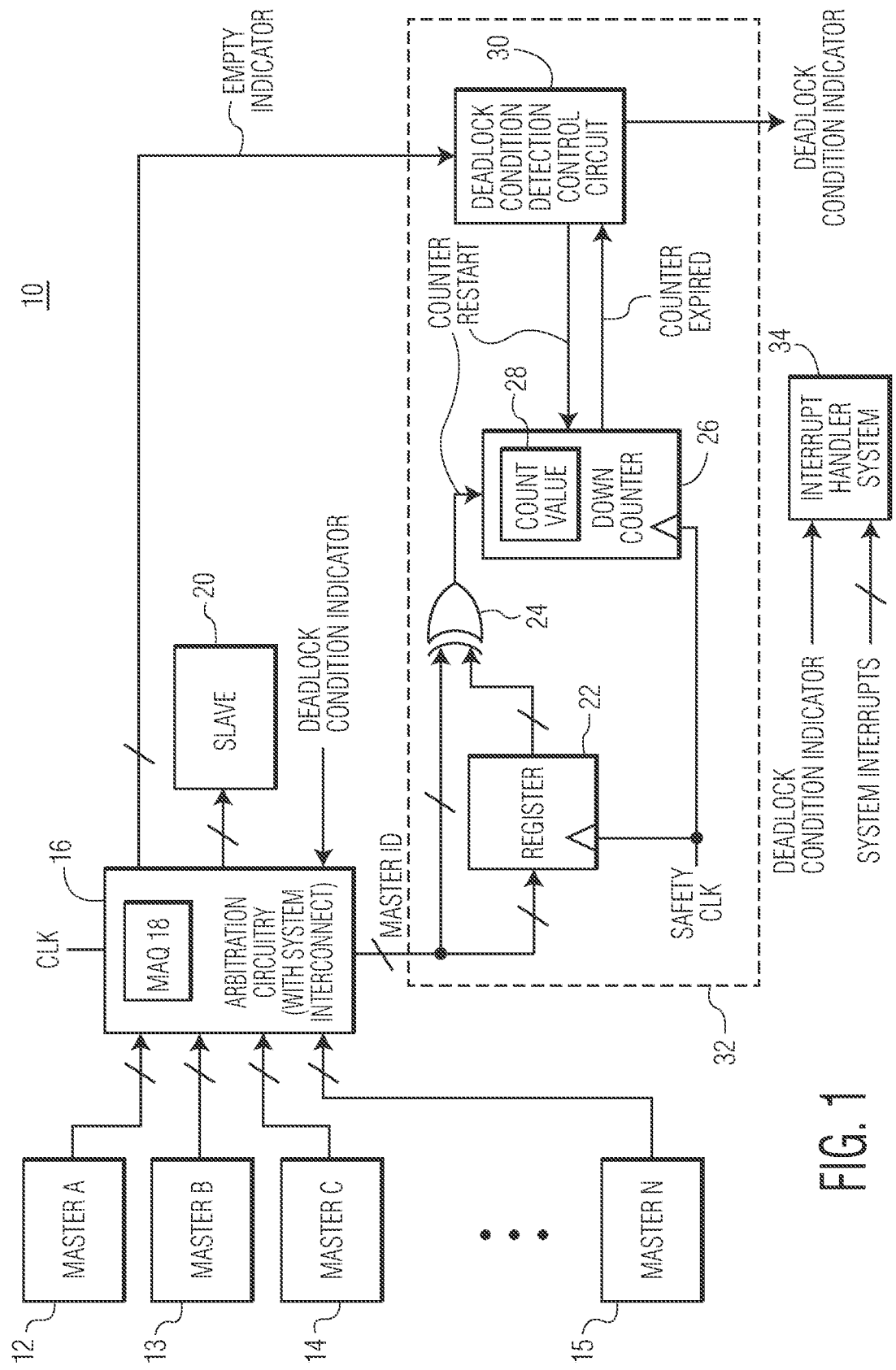
FIG. 1 illustrates, in block diagram form, a multiple master data processing system in accordance with one embodiment of the present invention.

FIG. 1 illustrates a data processing system 10 having N masters 12-15, arbitration circuitry 16 (including a system interconnect), a slave 20, a deadlock condition detection circuit 32, and an interrupt handler system 34. Each of the N masters 12-15 (in which N can be any integer greater than or equal to two) can be any type of master, such as a processor, graphics processor, direct memory access (DMA) controller, etc., and each master has an associated unique master identifier (ID). In the illustrated embodiment, each master 12-15 is associated with a letter, e.g., master 12 is master A, master 13 is master B, and master 14 is master C, and may thus be referred to as simply master A, master B, and master C, respectively. Slave 20 is shared by two or more masters and can be any type of slave, such as, for example, a memory or other peripheral. System 10 may include any number of slaves, but only one is illustrated for simplicity. Each master 12-15 and slave 20 is coupled to arbitration circuitry 16 by way of a corresponding port or interface of arbitration circuitry 16 (located where the arrows enter or exit arbitration circuitry 16), in which arbitration circuitry may implement a system interconnect, such as a system bus, fabric, cross-bar switch, or the like, and arbitrates communication between the masters and the slaves on the system interconnect. Arbitration circuitry 16 may implement any type of arbitration scheme. When arbitration circuitry 16 allows access by a master to a slave device, the master can be described as occupying the port associated with the slave. Data processing system 10 may be implemented as an SoC or NoC, in which may all of system 10 may be located on a single integrated circuit. Interrupt handler system 34 can receive and handle exceptions (e.g. system interrupts) within data processing system 10.

Deadlock condition detection circuit 32 includes storage circuitry 22 (which may be implemented as a register, and thus referred to as register 22), an XOR gate 24, a down-counter 26, and a deadlock condition detection control circuit 30 (which may simply be referred to as control circuit 30). A first input of XOR gate 24, register 22, and control circuit 30 each receives a master ID from arbitration logic 16 corresponding to the master ID of the master which is currently accessing slave 20. A second input of XOR gate 24 is coupled to an output of register 22 to receive the master ID stored in register 22. An output of XOR gate 24 provides a counter restart signal to down counter 26, in which when the counter restart signal is asserted (e.g. to a logic level one) the programmable count value (in storage circuitry 28 of counter 26) is reset to a predetermined reset count value. When the count value has expired (has counted down to zero), a counter expired signal is asserted. The counter expired signal is provided to deadlock condition detection control circuit 30 which also receives an empty indicator from a master access queue (MAQ) 18 within arbitration circuitry 16, and uses the counter expired signal and the empty indicator to generate a deadlock condition indicator. Deadlock condition detection control circuit 30 may also provide a counter restart signal to counter 26 to restart the counter from the reset count value. XOR gate 24 may be referred to as a logic element or device and may be implemented with one or more logic gates to provide the counter restart signal.

In one embodiment, MAQ 18 is implemented with a first in first out (FIFO) storage circuit and stores the master ID of any of masters 12-15 which are waiting to access slave 20 (while one of masters 12-15 is currently accessing slave 20). When there are no other masters waiting to access slave 20 (i.e. waiting to occupy the port of arbitration circuitry 16 associated with slave 20), MAQ 18 is empty, and therefore asserts the empty indicator. That is, the empty indicator is asserted when the port has no pending requests from other masters with a different master ID than the master currently occupying the port. Arbitration circuitry 16 receives a clock, CLK, and operates according to this clock. A clock input of register 22 and of down counter 26 receives a safety clock, safety CLK, and operate in response to active edges of the safety CLK (in which the active edges can refer to either the rising edges or falling edges of the safety CLK). For example, register 22, upon each active edge of safety CLK, stores the current master ID at its input, replacing the value current stored in register 22. With respect to down-counter 26, in response to each active edge of the safety CLK, down-counter 26 decrements the count value stored in storage circuitry 28. In one embodiment, the active edges refer to the rising edges of the safety CLK and in an alternate embodiment, the active edges refer to the falling edges. In one embodiment, the safety CLK is separate and independent from the CLK provided to arbitration circuitry 16. In this manner, deadlock condition detection circuit 32 continues to accurately run in response to the safety CLK, even if something happens to the CLK of arbitration circuit 16. Note that in the case of multiple clock domain, additional circuitry, such as clock domain crossing synchronizers, may be needed.

In one embodiment, deadlock condition detection circuit 32 corresponds to slave 20, and system 10 may include a separate deadlock condition detection circuit corresponding to each of one or more slaves of system 10, in which each deadlock condition detection circuit provides a deadlock condition indicator for a corresponding slave. Each deadlock condition detection circuit may include its own corresponding register XOR gate and counter, and each deadlock condition detection circuit may either include its own control circuit or share a control circuit. If the control circuit is shared, the control circuit may provide a counter restart to each deadlock condition detection circuit, and may provide a deadlock condition indicator corresponding to each slave. Also, note that arbitration circuitry 16 may include a queue like MAQ 18 for each slave in system 10, in which each queue provides a corresponding empty indicator.

Down-counter 26 is used to provide a specific period (i.e. duration) of time. For example, a reset count value is stored as the count value in storage circuitry any time the counter restart is asserted. With each rising (or falling) edge of the safety CLK, the count value is decremented, and when it expires (i.e. counts down to zero), a predetermined period of time, represented by the reset count value, has passed. The reset count value may be programmable such that it may be set as needed for a desired period of time. In alternate embodiments, down-counter 26 can be implemented differently to detect the passing of a period of time, and may therefore also be referred to as a timer circuit. For example, an up-counter can be used in which the counter is reset to 0, and the counter "expiring" corresponds to the counter value being incremented with each clock until it reaches a programable predetermined count value (representative of the period of time). Alternatively, other circuitry may be used, such as different types of timers. In one embodiment each different counter or timer corresponding to each slave can have a different reset count value to set a different period of time per slave.

In operation, counter 26 starts counting down from the reset count value each time the master ID the master accessing slave 20 changes. If counter 26 expires (meaning the predetermined period of time has elapsed), deadlock condition detection control circuit 30 determines if there are other masters in system 10 waiting to access slave 20 (i.e. waiting to occupy the port associated with slave 20). If so (i.e. if MAQ 18 is not empty), a potential deadlock condition is indicated, and the deadlock indicator is asserted. In one embodiment, the deadlock indicator is provided as an interrupt such that, when a potential deadlock condition is indicated, an interrupt is generated by control circuit 30 which can be detected and handled by interrupt handler system 34 within system 10. (If the deadlock indicator is not provided as an interrupt, it does not need to be provided to interrupt handler system 34.) In one embodiment, the deadlock indicator is provided back to arbitration circuitry 16 so that arbitration circuitry 16, in response to assertion of the deadlock condition indicator, forces a switch to the next highest priority master in MAQ 18 waiting to access slave 20. Also, in one embodiment, detection of a deadlock condition may be logged for future diagnostics. For example, control circuit 30 may include storage circuitry for storing the detected deadlock conditions. Note that if counter 26 expires but no other master in system 10 is waiting to access slave 20 (i.e. the empty indicator signal from MAQ 18 is asserted), no potential deadlock condition is detected, and the current master can continue accessing slave 20. In this case, counter 26 is reset since the on-going master access can be treated as a separate duration of occupation of the slave port by a master.

Figure 2:
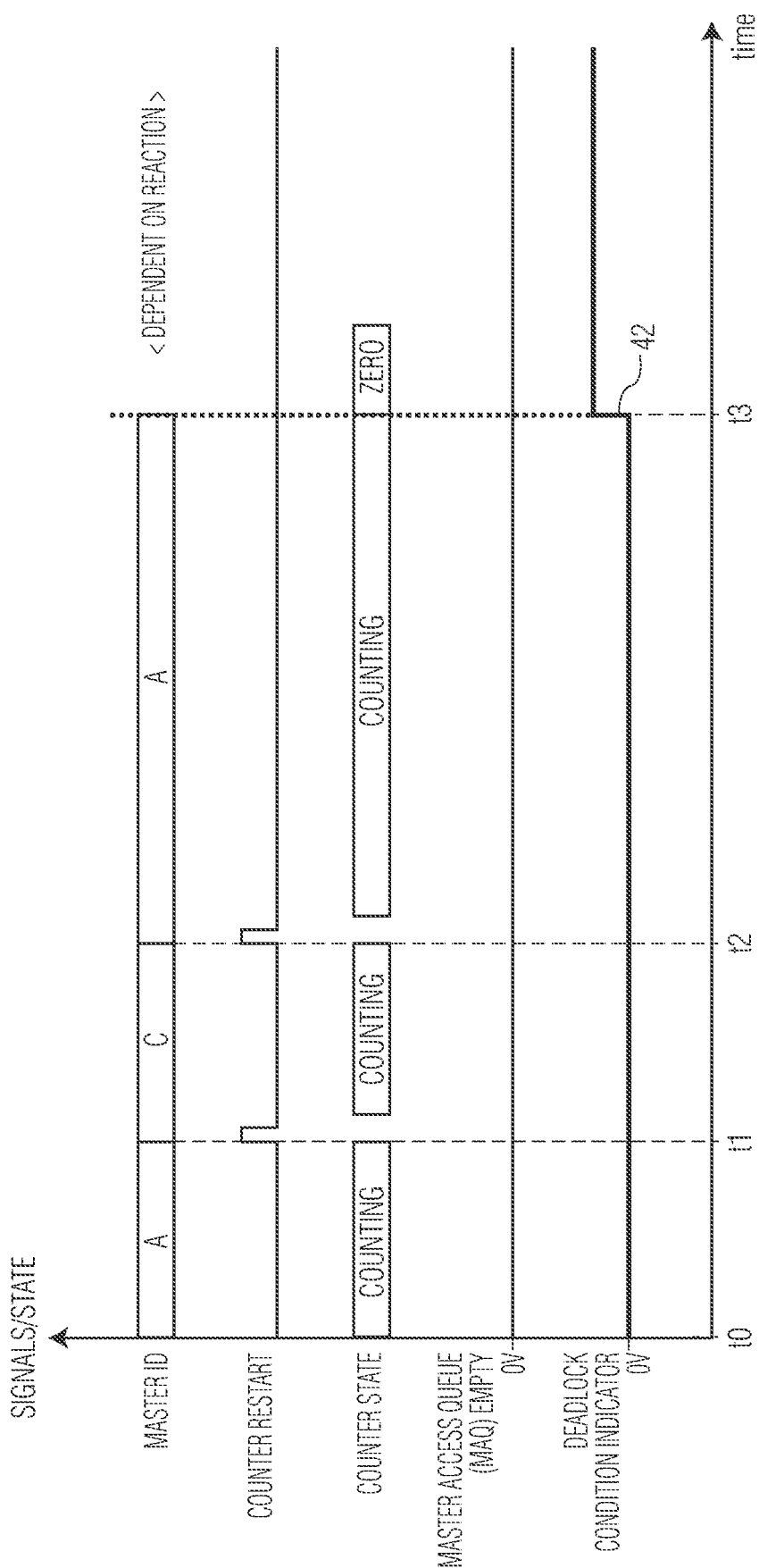
FIGS. 2 and 3 illustrate, in timing diagram forms, signals and states within the data processing system of FIG. 1 used to detect a deadlock condition, in accordance with embodiments of the present invention.
Figure 3:
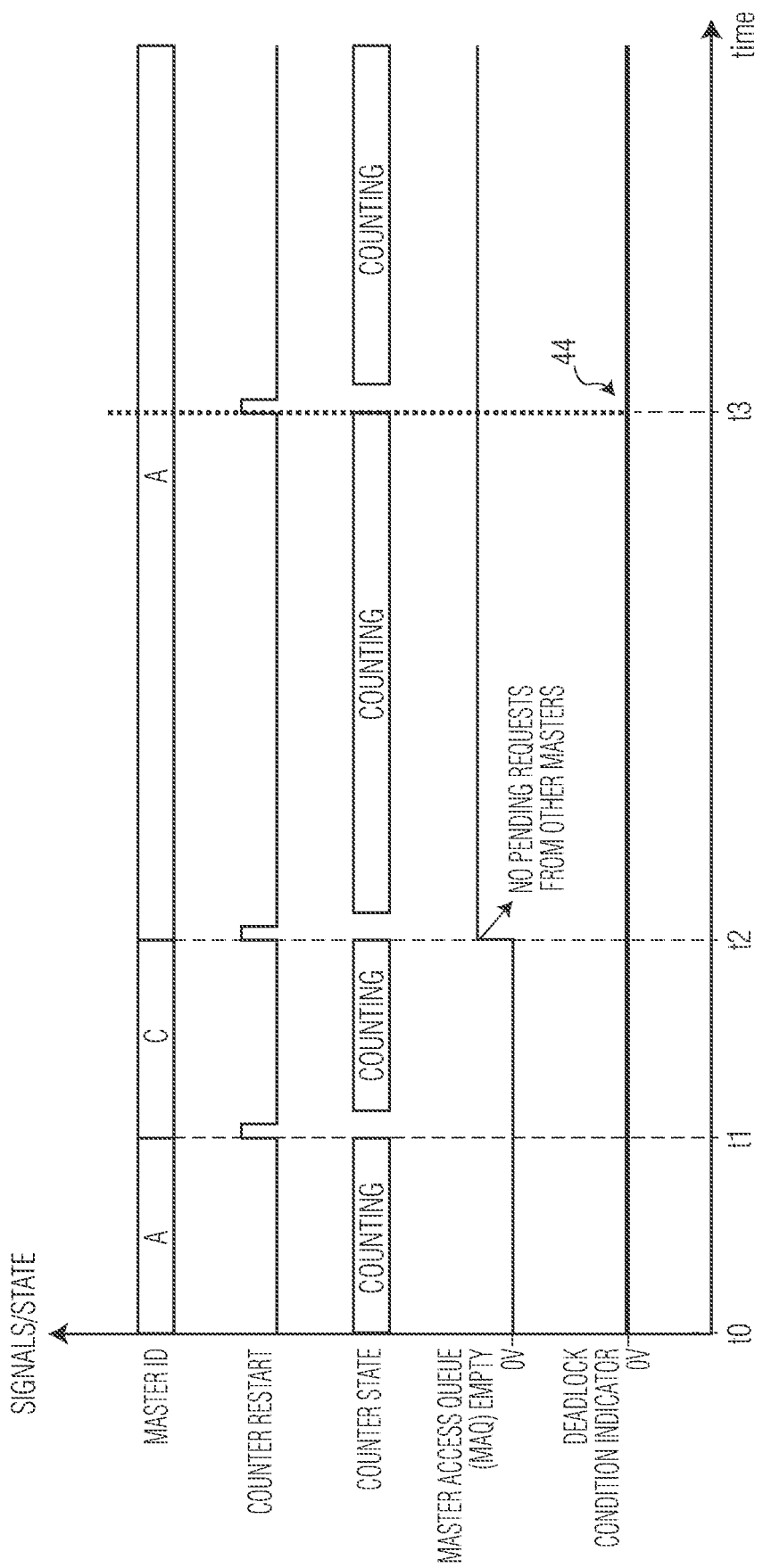

Operation of system 10 will be further described in reference to the timing diagrams of FIGS. 2 and 3. Referring to FIG. 2, at time t0, master A is accessing slave 20 (i.e. master A is occupying the port associated with slave 20) and with each active edge of the safety CLK, counter 26 is decrementing the count value. Therefore, the counter state of "counting" indicates that counter 26 is counting the clock cycles of the safety CLK. Register 22 stores the unique master ID of master A. The empty indicator from MAQ 18 is negated (i.e. deasserted) at a logic level low, indicating that MAQ 18 is not empty and thus there are other masters waiting to access slave 20.

At time t1, access to slave 20 changes from master A to master C (in which master C now occupies the port associated with slave 20). At the point that this switch occurs, the current master ID from arbitration circuitry 16 to the first input of XOR gate 24 changes to the unique master ID of master C, but the output of register 22 still stores the unique ID of master A (until the next active edge of the safety CLK). At the point of the switch, the inputs to XOR gate 24 no longer match (with the ID of master A at the first input and the ID of master C at the second input). Due to this mismatch, the output of XOR gate 24 (corresponding to the counter restart signal) is asserted. Therefore, at the following active edge of the safety CLK, the unique ID of master C is stored into register 22 (such that now the inputs to XOR gate 24 match), resulting in the negation of the counter restart signal. Also, at this active edge of the safety CLK, with the counter restart signal asserted, the count value gets reset to the reset count value. Counter 26 again enters the counting state and starts counting down from the reset count value while master C is accessing slave 20. Note that counter 26 did not expire prior to the accessing master switching from master A to master C (i.e. prior to time t1), therefore, no potential deadlock condition is indicated because the arbitration circuitry 16 did allow another master to access slave 20.

Similar activity occurs at time t2. That is, at time t2, access to slave 20 changes from master C back to master A. Again, due to this switch, the output of XOR gate 24 goes high for a clock cycle of the safety CLK (until register 22 captures the master ID of master A), thus resetting the count value of counter 26 to the reset count value. Again, counter 26 did not expire, therefore, no potential deadlock condition is indicated. After time t2 and after the counter restart signal is again negated, counter 26 is again in the "counting" state such that the count value is decremented with each active edge of the safety CLK.

At time t3, counter 26 reaches zero (i.e. expires). At this point, control circuit 30 uses the empty indicator to determine if other masters are waiting to access slave 20 (i.e. waiting to occupy the port associated with slave 20). Since the empty indicator remains deasserted (indicating that MAQ 18 is not yet empty), there is at least one other master waiting to access slave 20. Therefore, a potential deadlock condition is detected, and control circuit 30 asserts the deadlock condition indicator. Note that after time t3, the determination of which master can access slave 20 is dependent on the reaction of system 10. Also, at this point, data processing system 10, in response to assertion of the deadlock condition indicator, can take an action to eliminate the deadlock. For example, as discussed above, arbitration circuitry 16 may, in response to assertion of the deadlock condition indicator, force a switch to a different master in MAQ 18 (e.g. relinquish access to a next highest priority master). Alternatively, an interrupt may be generated, and system 10 may use any method to process the interrupt and determine how arbitration circuitry 16 should proceed.

Note that, if using a current technique which simply monitors responsiveness of the slave to determine deadlock conditions, the deadlock condition of FIG. 2 would not be detected, and slave 20 would be starved from accesses by lower priority masters. That is, the deadlock condition of FIG. 2 could occur even when the masters of system 10 and slave 20 are fully functional and responsive, and yet the potential deadlock condition would still be detected. Similarly, if using a current technique which simply applies a round robin scheme, a higher priority master cannot be given a longer amount of time to access the slave. However, with the embodiments herein, even if a higher priority master is given more time to access a slave, the monitoring of master accesses to the slave as illustrated in FIG. 2 can still detect deadlock conditions and prevent starvation of lower priority masters.

FIG. 3 illustrates a situation in which the counter does expire, but since there are no other masters waiting to access slave 20, master A is permitted to continue accessing slave 20 (which may thus allow for reduction in unnecessary switching of masters). Operation of system 10 through time t2 is the same as described with respect to FIG. 2, with the exception that at time t2, upon the switch from master C back to master A, the empty indicator is asserted by MAQ 18, indicating that MAQ 18 is empty (and thus no other masters are waiting, at that point, to access slave 20). At time t3, just as in FIG. 2, counter 26 expires. At time t3, control circuit 30 uses the asserted empty indicator to determine that no masters are waiting to access slave 20 and therefore, the deadlock condition is not asserted. Also, upon making the determination that no deadlock condition is present, control circuit 30 can restart counter 26 such that counter 26 again enters the counting stage where it continues to decrement from the reset count value in response to the active edges of the safety CLK.

In one embodiment, rather than receiving counter restart signals from both XOR gate 24 and control circuit 30, the output of XOR gate 24 and the deadlock condition indicator can be ORed together and provided as the final counter restart signal to counter 26.

Therefore, by now it can be appreciated how access to a slave can be monitored to detect a potential deadlock condition and thus provide the possibility to avoid a deadlock. By determining that a switch in masters accessing a slave has not occurred within a predetermined interval of time, and yet there are still masters waiting to access that slave, a deadlock condition indicator can be asserted (or an interrupt generated) to prevent or fix the potential deadlock condition. In one embodiment, a counter (which may also be referred to as a watchdog timer) is used to indicate the predetermined intervals of time, and the unique IDs of the masters are used to determine whether a switch in master occurred. Also, in one embodiment, one or more signals from the arbitration circuitry can be used to determine whether, upon expiration of the counter (or watchdog timer), other masters are waiting to access the slave.

The conductors discussed or illustrated herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of system 10 are circuitry located on a single integrated circuit or within a same device, such as within an SoC or NoC. Alternatively, system 10 may include any number of separate integrated circuits or separate devices interconnected with each other. Furthermore, data processing system 10 may include more or fewer elements, such as more masters (or fewer masters), slaves, peripherals, memories, or the like, than as illustrated in FIG. 1.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, different circuitry may be used to detect a change in masters accessing the corresponding slave, different circuitry may be used to indicate the expiration of the predetermined period of time upon which to check for a deadlock condition, or different circuitry may be used to indicate whether or not other masters are waiting to access the corresponding slave. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a processing system includes a first bus master device; a second bus master device; a bus slave device accessible by the first and second bus master devices; arbitration circuitry coupled between the first and second bus master devices, and the bus slave device; a storage element configured to receive, from the arbitration circuitry, an identifier of the first bus master device when the first bus master device begins occupying a port associated with the bus slave device; a counter circuit configured to assert a counter expired indicator when a predetermined period of time passes; and a deadlock condition detection control circuit configured to assert a deadlock condition indicator when the first bus master device continues to occupy the port associated with the bus slave device, the counter expired indicator is asserted, and the second bus master device is waiting to occupy the port associated with the bus slave device. In one aspect, the counter circuit is further configured to restart a counter when the second bus master device begins occupying the port associated with the bus slave device. In another aspect, the counter circuit is further configured to restart a counter when the predetermined period of time passes while the first bus master device continues occupying the port associated with the bus slave device. In another aspect the processing system further includes a logic element including a first input coupled to receive the identifier from the arbitration circuitry, a second input coupled to receive the identifier in the storage element, and an output providing a counter restart signal to the counter circuit when the first bus master device discontinues occupying the port associated with the bus slave device and the second bus master device begins occupying the port associated with the bus slave device. In another aspect, the deadlock condition detection control circuit is further configured to store a log of detected deadlock conditions. In yet another aspect, the deadlock condition detection control circuit provides the deadlock condition indicator to the arbitration circuitry, and when the deadlock condition indicator is asserted, the arbitration circuitry discontinues allowing the first bus master devices to occupy the port associated with the bus slave device. In yet another aspect, when the deadlock condition indicator is asserted, an interrupt is generated which can be detected and handled by an interrupt handler system.

In another embodiment, a processing system includes bus master devices; bus slave devices; arbitration circuitry coupled between the bus master devices and the bus slave devices; a master access queue for each of the bus slave devices, each entry of the master access queue indicating whether a first of the bus master devices is accessing a respective one of the bus slave devices while a second of the bus master devices is waiting to access the one of the bus slave devices; counter circuits corresponding to each of the bus slave devices, the counter circuits configured to reset to a starting value upon expiration of a specified time period; and a deadlock condition detection control circuit configured to assert a deadlock condition indicator when the first of the bus master devices is accessing the one of the bus slave devices when one of the counters corresponding to the one of the bus slave devices is reset and an entry in one of the master access queues corresponding to the one of the bus slave devices indicates the second of the bus master devices is waiting to access the one of the bus slave devices. In one aspect, the arbitration circuitry is further configured to relinquish access to the one of the bus slave devices to the second of the bus master devices when the deadlock condition indicator is asserted. In another aspect, the arbitration circuitry is further configured to relinquish access to the one of the bus slave devices to one of the bus master devices with a next highest priority when the deadlock condition indicator is asserted. In yet another aspect, the processing system further includes master registers configured to store an identifier of each of the bus master devices currently accessing a corresponding one of the bus slave devices. In a further aspect, the processing system further includes a logic device coupled to the master registers and the arbitration circuitry, the logic device configured to assert a counter restart indicator when one of the bus master devices finishes accessing one of the bus slave devices and another of the bus master devices begins accessing the one of the bus slave devices. In another further aspect, the counter circuits are further configured to restart at an initial value when one of the first bus master devices continues accessing one of the bus slave devices longer than the specified amount of time and a second one of bus master devices is not waiting to access the one of the bus slave devices. In another aspect of the another embodiment, when the deadlock condition indicator is asserted, an interrupt is generated which can be detected and handled by an interrupt handler system.

In yet another embodiment, a method of controlling deadlock in a processing system includes asserting a deadlock condition indicator when: a timer in a timer circuit has passed a predetermined period of time while a first bus master device occupies a port of a bus slave device, and an empty indicator indicates a second bus master is waiting to occupy the port of the bus slave device while the first bus master is occupying the port of the bus slave device; and taking an action to eliminate the deadlock when the deadlock condition indicator is asserted. In one aspect, the method further includes forcing the first bus master device to relinquish access to the second bus slave device, and granting access to the second bus slave device to another bus master device with a next highest priority, when the deadlock condition indicator is asserted. In another aspect, asserting a timer restart signal in the timer circuit when the first bus master device discontinues occupying the port of the bus slave device and the second bus master devices begins occupying the port of the bus slave device. In yet another aspect, the method further includes, when the deadlock condition indicator is asserted, generating an interrupt that can be detected and handled by an interrupt handler system. In a further aspect, the method further includes providing the deadlock condition indicator to the arbitration circuitry, and when the deadlock condition indicator is asserted, the arbitration circuitry stops the first bus master device from occupying the port of the bus slave device when the second bus master device is waiting to occupy the port. In yet another aspect of the yet another embodiment, the method further includes restarting the timer when the first bus master device continues occupying the port of the bus slave device past the predetermined period of time and the second bus master device is not waiting to occupy the port of the bus slave device.

What is claimed is:

1. A processing system comprising:
   a first bus master device;
   a second bus master device;
   a bus slave device accessible by the first and second bus master devices;
   arbitration circuitry coupled between the first and second bus master devices, and the bus slave device;
   a storage element configured to receive, from the arbitration circuitry, an identifier of the first bus master device when the first bus master device begins occupying a port associated with the bus slave device;
   a counter circuit configured to assert a counter expired indicator when a predetermined period of time passes;
   a deadlock condition detection control circuit configured to assert a deadlock condition indicator when the first bus master device continues to occupy the port associated with the bus slave device, the counter expired indicator is asserted, and the second bus master device is waiting to occupy the port associated with the bus slave device; and
   a logic element including a first input coupled to receive the identifier from the arbitration circuitry, a second input coupled to receive the identifier in the storage element, and an output providing a counter restart signal to the counter circuit when the first bus master device discontinues occupying the port associated with the bus slave device and the second bus master device begins occupying the port associated with the bus slave device.

2. The processing system of claim 1, wherein the counter circuit is further configured to:
   restart a counter when the second bus master device begins occupying the port associated with the bus slave device.

3. The processing system of claim 1, wherein the counter circuit is further configured to:
   restart a counter when the predetermined period of time passes while the first bus master device continues occupying the port associated with the bus slave device.

4. The processing system of claim 1 wherein the deadlock condition detection control circuit is further configured to:
   store a log of detected deadlock conditions.

5. The processing system of claim 1 wherein the deadlock condition detection control circuit provides the deadlock condition indicator to the arbitration circuitry, and when the deadlock condition indicator is asserted, the arbitration circuitry discontinues allowing the first bus master devices to occupy the port associated with the bus slave device.

6. The processing system of claim 1, wherein when the deadlock condition indicator is asserted, an interrupt is generated which can be detected and handled by an interrupt handler system.

7. A processing system comprising:
   bus master devices;
   bus slave devices;
   arbitration circuitry coupled between the bus master devices and the bus slave devices;
   a master access queue for each of the bus slave devices, each entry of the master access queue indicating whether a first of the bus master devices is accessing a respective one of the bus slave devices while a second of the bus master devices is waiting to access the one of the bus slave devices;
   counter circuits corresponding to each of the bus slave devices, the counter circuits configured to reset to a starting value upon expiration of a specified time period;

a deadlock condition detection control circuit configured to assert a deadlock condition indicator when the first of the bus master devices is accessing the one of the bus slave devices when one of the counters corresponding to the one of the bus slave devices is reset and an entry in one of the master access queues corresponding to the one of the bus slave devices indicates the second of the bus master devices is waiting to access the one of the bus slave devices.

8. The processing system of claim 7 wherein the arbitration circuitry is further configured to relinquish access to the one of the bus slave devices to the second of the bus master devices when the deadlock condition indicator is asserted.

9. The processing system of claim 7 wherein the arbitration circuitry further configured to relinquish access to the one of the bus slave devices to one of the bus master devices with a next highest priority when the deadlock condition indicator is asserted.

10. The processing system of claim 7 further comprising:
master registers configured to store an identifier of each of the bus master devices currently accessing a corresponding one of the bus slave devices.

11. The processing system of claim 10 further comprising:
a logic device coupled to the master registers and the arbitration circuitry, the logic device configured to assert a counter restart indicator when one of the bus master devices finishes accessing one of the bus slave devices and another of the bus master devices begins accessing the one of the bus slave devices.

12. The processing system of claim 9 wherein the counter circuits are further configured to:
restart at an initial value when one of the first bus master devices continues accessing one of the bus slave devices longer than the specified amount of time and a second one of bus master devices is not waiting to access the one of the bus slave devices.

13. The processing system of claim 7, wherein when the deadlock condition indicator is asserted, an interrupt is generated which can be detected and handled by an interrupt handler system.

14. A method of controlling deadlock in a processing system comprising:
maintaining a master access queue which stores identifiers of any bus master devices waiting to access a slave device;
asserting an empty indicator when the master access queue is empty;
asserting a deadlock condition indicator when:
a timer in a timer circuit has passed a predetermined period of time while a first bus master device occupies a port of a bus slave device, and
the empty indicator is not asserted, indicating that a second bus master is waiting to occupy the port of the bus slave device while the first bus master is occupying the port of the bus slave device; and
taking an action to eliminate the deadlock when the deadlock condition indicator is asserted.

15. The method of claim 14, further comprising:
forcing the first bus master device to relinquish access to the second bus slave device, and granting access to the second bus slave device to another bus master device with a next highest priority, when the deadlock condition indicator is asserted.

16. The method of claim 14 further comprising:
asserting a timer restart signal in the timer circuit when the first bus master device discontinues occupying the port of the bus slave device and the second bus master devices begins occupying the port of the bus slave device.

17. The method of claim 14 further comprising:
when the deadlock condition indicator is asserted, generating an interrupt that can be detected and handled by an interrupt handler system.

18. The method of claim 17 further comprising:
providing the deadlock condition indicator to the arbitration circuitry, and when the deadlock condition indicator is asserted, the arbitration circuitry stops the first bus master device from occupying the port of the bus slave device when the second bus master device is waiting to occupy the port.

19. The method of claim 14, further comprising:
restarting the timer when the first bus master device continues occupying the port of the bus slave device past the predetermined period of time and the second bus master device is not waiting to occupy the port of the bus slave device.

* * * * *